United States Patent
LeCrone et al.

(10) Patent No.: US 7,039,659 B2
(45) Date of Patent: May 2, 2006

(54) METHOD AND APPARATUS FOR MAKING DIFFERENTIAL INDEPENDENT DATA COPIES IN A DATA PROCESSING SYSTEM

(75) Inventors: Douglas E. LeCrone, Hopkinton, MA (US); Bruce A. Pocock, Titusville, FL (US)

(73) Assignee: EMC Corporation, Hopkinton, MA (US)

( * ) Notice: Subject to any disclaimer, the term of this patent is extended or adjusted under 35 U.S.C. 154(b) by 510 days.

(21) Appl. No.: 10/179,421

(22) Filed: Jun. 25, 2002

(65) Prior Publication Data

US 2003/0236801 A1 Dec. 25, 2003

(51) Int. Cl.
*G06F 17/30* (2006.01)

(52) U.S. Cl. .................... 707/203; 707/3; 707/102

(58) Field of Classification Search ............... 707/1–10, 707/100–104.1, 200–205; 711/162
See application file for complete search history.

(56) References Cited

U.S. PATENT DOCUMENTS

| 6,363,385 B1 | 3/2002 | Kedem et al. ............... 707/10 |
| 6,732,245 B1 * | 5/2004 | Kaiya et al. ............... 711/162 |
| 2003/0182330 A1 * | 9/2003 | Manley et al. ............. 707/205 |

* cited by examiner

*Primary Examiner*—Mohammad Ali
(74) *Attorney, Agent, or Firm*—George A. Herbster

(57) ABSTRACT

Data is copied from a source storage device to a destination storage device in a differential mode. An extents track defines all tracks to be transferred during a first copying operation. Complementary track tables for source and destination storage devices establishing the totality of changes in data since a previous copying program to limit subsequent copying to data on changed tracks only.

50 Claims, 8 Drawing Sheets

METHOD AND APPARATUS FOR MAKING DIFFERENTIAL INDEPENDENT DATA COPIES IN A DATA PROCESSING SYSTEM

BACKGROUND OF THE INVENTION

1. Field of the Invention

This invention generally relates to data processing systems that have the capability of making independent data copies and more particularly to a method and apparatus for updating those copies on a differential basis.

2. Description of Related Art

U.S. Pat. No. 6,363,385, to Kedem et al. discloses a method and apparatus for copying portions of a data set from one logical volume to another in one or more data storage facilities. More specifically, in accordance with the described method and apparatus, portions of a data file residing in a defined extent of tracks are copied from a source storage device to a destination storage device in response to a copy command from a requesting host application. The command identifies the source file and the storage locations in a destination storage device. An extents track is formed to establish an environment in which the file will be copied. The calling system receives an immediate response to the command that the copy operation is complete even though no data has been copied.

Application programs may access the file in either the source storage device or the destination storage device at any time during the process. A copy program transfers the file portions on a track-by-track basis to the destination storage device. Procedures assure that any data access to a particular track in either the source or destination storage device by any application prior to the transfer of that track is accommodated to maintain data integrity. In Symmetrix data storage facilities available from the assignee of this invention, this copy operation is called a "SNAP" operation and is requested by issuing a "FILE SMMF" command.

Sometimes it is desired to make successive copies at different times or after successive intervals. With the foregoing system, it is necessary to initiate the same FILE SMMF command for each copy. Consequently each successive copying operation copies all the data in the defined extent even though changes may only be limited to a few of many tracks. As will also be apparent, each copying requires resources from the data storage facility. As such data storage facilities become more sophisticated, excessive and unnecessary use of those resources becomes a detriment. So it would be advantageous to provide a differential copying operation for use during second and subsequent copying operations that transfers only changed data.

One obvious approach for minimizing resource utilization might include using information in the track change tables associated with the FILE SMMF command to generate new extents at the time of a second and subsequent copying operation. However, it is possible to have a large number of extents. If every other track were changed over an interval of time, for example, a 32,000-track system would require 16,000 extents. As disclosed in U.S. Pat. No. 6,363,385, the process of making a copy incorporates the step of blocking access to each extent track during initial processing. That block, or lock, requires time and could introduce unacceptable delays whenever the number of extent tracks reached a large number. Such an approach would also be difficult to implement in existing systems.

SUMMARY

Therefore it is an object of this invention to provide a data processing system with the capability of providing independent data copies on a differential basis whereby a copying operation only involves data changed after a prior copying operation.

Another object of this invention is to provide a data processing system with the capability of copying data differentially from a source storage device to a destination storage device.

Yet another object of this invention is to provide a data processing system with the capability of providing copies of data from a source storage device to a destination storage device that only involves the transfer of data in changed tracks of a magnetic disk storage device.

Still another object of this invention is to provide a data processing system with the capability of providing differential copies of data from a source storage device to a destination thereby to minimize the impact on data processing system and data storage facility resources.

In accordance with this invention, data is organized in designated data blocks, such as individual tracks in magnetic disk storage devices and can be copied from addressed locations in a source storage device to addressed locations in a destination storage device with a series of copying operations spaced in time by using a copy program that has a data block selection control for defining data blocks to be copied. Changes that occur to data blocks in the source and destination storage devices are recorded during a given interval between successive copying operations as source and destination data block changes, respectively. At the end of the given interval the source and destination data block change recordings identify each data block in the source and destination storage devices, respectively, that changed during the given interval. At the beginning of a successive interval the information in the source and destination change recordings and in the data block selection control is combined thereby to identify those data blocks that need to be copied by virtue of each change during the given interval. This combined information changes the source and destination data block recordings whereby the recordings thereafter reflect only the changes made to the source and destination storage device data blocks during the successive interval.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATED EMBODIMENTS

Figure 1:
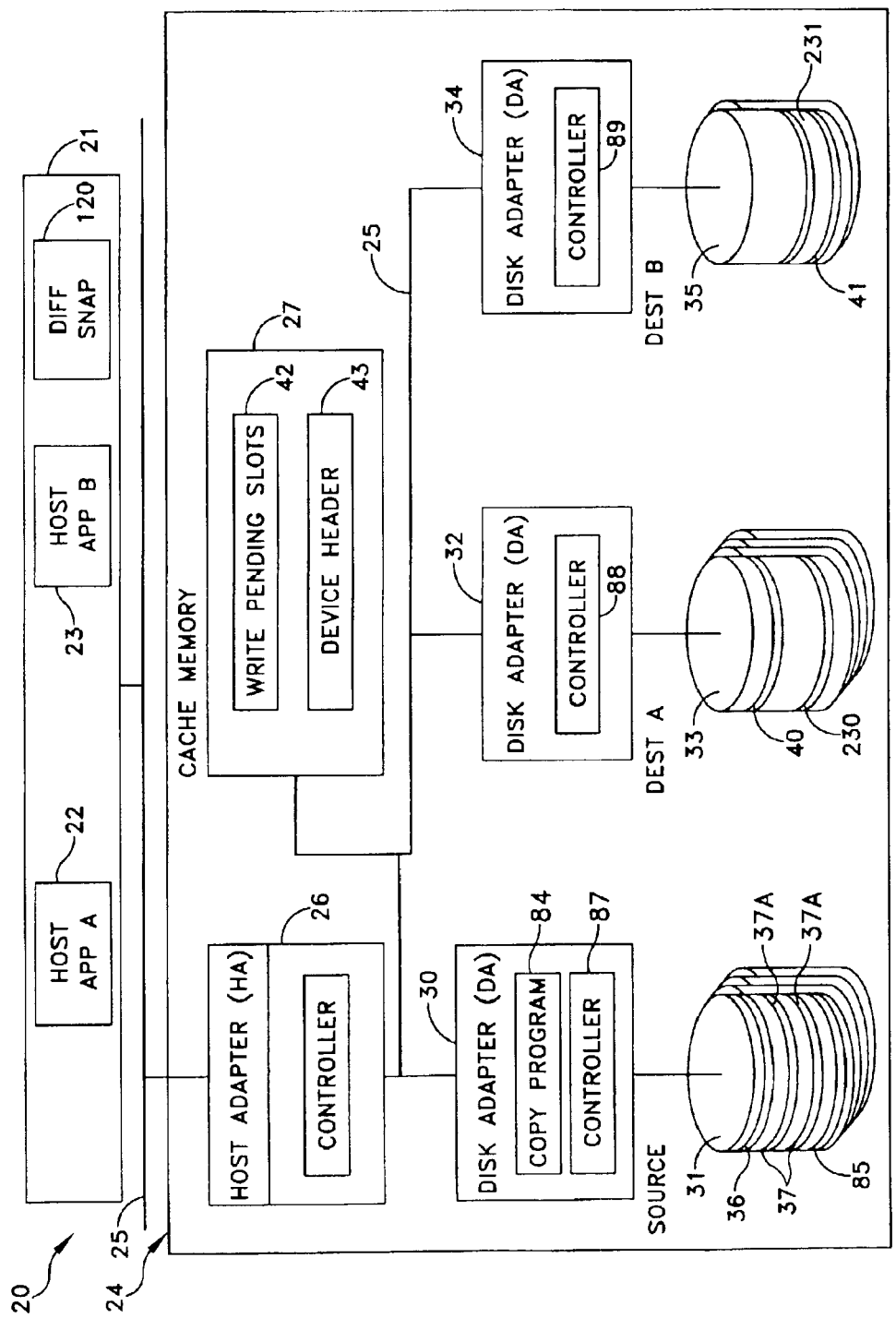
FIG. 1 is a block diagram of a data processing system, including a data storage facility, that can implement this invention.

By way of background, it will be helpful to review certain aspects of the apparatus and method of U.S. Pat. No. 6,363,385. FIG. 1 depicts a data processing system 20 with a host array 21 in which one or more host devices control operations. Each host device processes a program, and in the following discussion "host application" means a particular application program, procedure, process, module or the like being processed on one or more hosts. FIG. 1 depicts, as examples, a HOST APP A application 22 and a HOST APP B application 23. As will become apparent, this invention can also be applied to systems that incorporate multiple data storage facilities that can be located at the same geographical site as the data storage facility 24, at one or more remote geographical locations or at both types of sites.

Each host application accesses and processes data stored in a data storage facility 24 over a system bus 25 that can take any of several known forms including single and parallel bus structures. For purposes of this explanation the data storage facility 24 can be considered to store all the data that will be processed either by HOST APP A application 22 or HOST APP B application 23.

This invention also can be implemented in a number of disk storage facilities of different types and configurations. The following description is made in the context of the specific data storage facility 24 in FIG. 1, namely: a Symmetrix disk array storage device (DASD) available from the EMC Corporation, the assignee of this invention. However, this specifically described embodiment is readily adapted for implementation of this invention with facilities of other manufacturers as will be readily apparent to persons of ordinary skill in the art.

A data storage facility 24 that comprises a Symmetrix disk array storage device has a host adapter 26 and a cache memory 27. The host adapter 26 and cache memory 27 communicate with each other and with a series of disk adapters and physical magnetic disk drives, as examples of data storage devices. FIG. 1 depicts, for example, a first disk adapter (DA) 30 with an array of physical disks that store one or more logical volumes including a logical volume 31; a disk adapter 32, including a logical volume 33; and a disk adapter 34, including a logical volume 35.

The configuration of data is entirely arbitrary. For purposes of explaining this invention it is assumed that a physical device stores data in one or more logical volumes. A logical volume may comprise a portion of a single physical device, a complete physical device, portions of multiple physical devices or even multiple complete physical devices. Such logical devices, or storage devices, may also contain contiguous data blocks of some arbitrary size that define a data set or file. FIG. 1 depicts a first file 36 in a set of contiguous data tracks, a track representing the minimum sized data block that a Symmetrix disk array storage device transfers. A second file 37 is located in two separated sets 37A and 37B of contiguous data tracks.

Independent Copying in a SNAP Operation

As shown in U.S. Pat. No. 6,363,385, it is not necessary to transfer of all the data in the logical volume 31 during a copying operation. Rather, it is possible to transfer only the data in file 36 to the logical volume 33 and only the data in the file 37 to the locations in the logical volume 35. For purposes of these two specific transfers, the logical volume 31 is termed a "source storage device" 31 while the logical volumes 33 and 35 are termed "destination storage devices", specifically a DEST A device 33 and a DEST B device 35 in FIG. 1.

Assume the HOST APP A application 22 processes data in the file 36. That application or any other host application as a requesting host application could then determine a need to make a copy of that file at the storage locations 40 in the DEST A device 33 for use by the HOST APP B application 23. In accordance with U.S. Pat. No. 6,363,385, the requesting host application issues a FILE SMMF command that identifies a file in a source storage device, such as the file 36, and a destination for that file, such as the storage location 40 in the DEST A device 33.

The requesting host application and the host adapter 26 interact to establish the environment for the transfer. During the time required to establish this environment, normally, within a few milliseconds, the source storage device 31 and DEST A device 33 are locked; that is, they are not available to any host application for any disk operations including read and write operations even from the requesting host application. However, as soon as the environment is established and the host adapter produces an internal command for producing the copy, the source storage device 31 and DEST A device 33 are unlocked and again enabled to communicate with any host applications. For example, the HOST APP A and HOST APP B applications 22 and 23 might be enabled to interact with the file 36 and the copy at the storage location 40, respectively.

Immediately after the environment is established, there is no valid data in the DEST A device 33. However, a copy program proceeds in an orderly fashion to make the copy. Any attempt to write data to the file 36 in source storage device 31 or to read or write data from any copy, such as the file copy in the storage locations in the DEST A device 33, produces a priority transfer of relevant data so that the data in the two copies of the data file are maintained with integrity.

Figure 2:
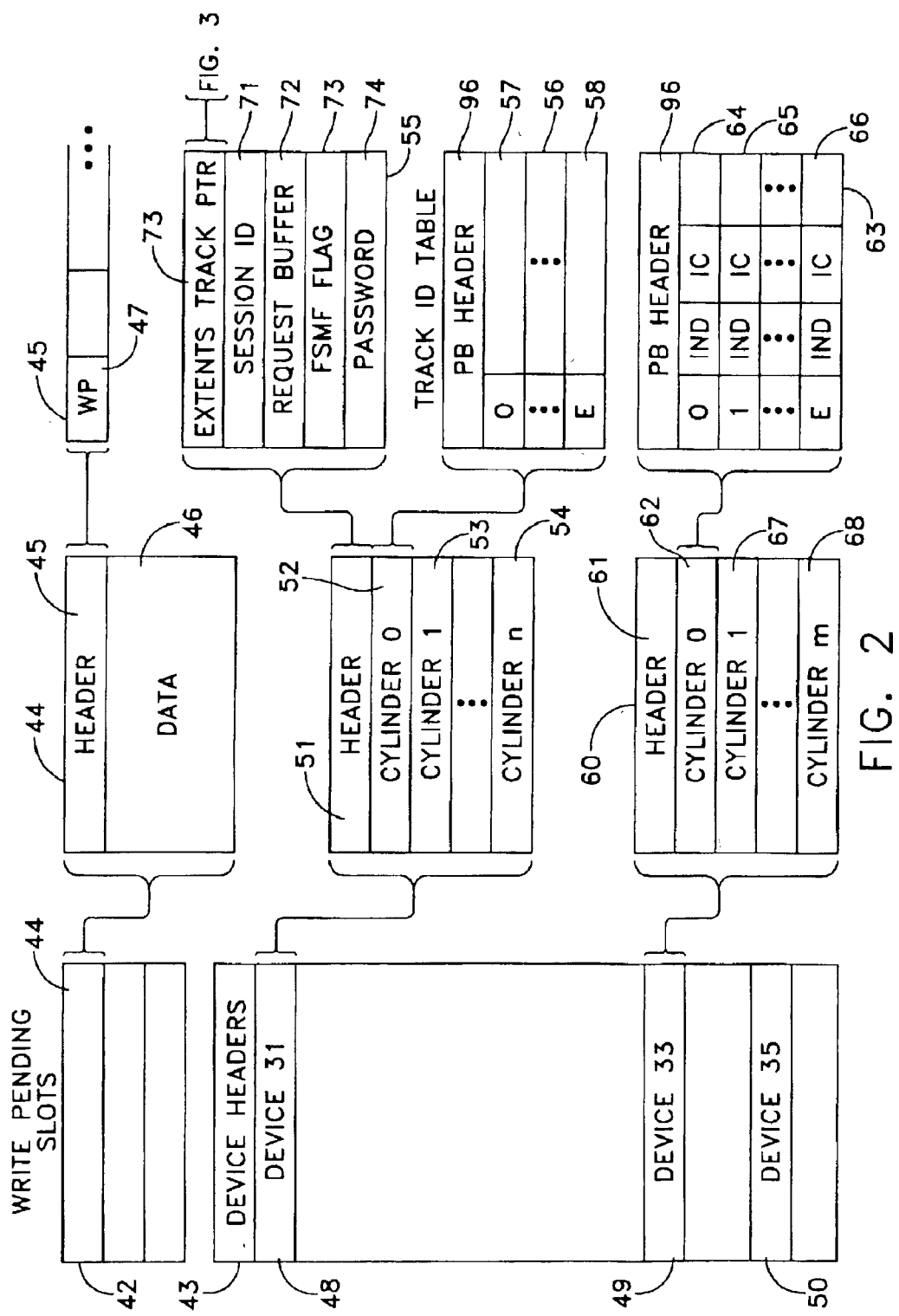
FIG. 2 is a more detailed description of a cache memory as shown in FIG. 1.

FIG. 2 depicts in detail those portions of the cache memory 27 that are relevant to an implementation this invention, particularly with respect to write pending slots 42 and device headers 43. Using data structures within a cache memory as write pending slots and device headers is generally well-known in the art. An individual write pending slot, such as a write pending slot 44, could include a header 45 followed by the data in a data block 46. Normally this data block will contain the data for one physical track. Each header 45 includes a WP flag 47 that indicates a need for destaging the process by which data, from one of the write pending slots 42, in the cache memory 27 transfers to a location in a logical volume in a physical disk device. Once the data is transferred from the cache memory 27 to a corresponding data storage device, such as the source storage device 31, the system clears the WP bit 47 for that slot. Each header includes other information that is not relevant to this invention and, accordingly, is not shown.

The device headers 43 will include one entry for each logical volume or device in the Symmetrix DASD. Three such entries are shown, namely: entry 48 for the source storage device 31; entry 49 for destination storage device 33; and entry 50 for destination storage device 35. Each of these entries has the same organization. That is, the device entry 48 includes a header 51 and a plurality of entries for each cylinder in the device 31. Three specific entries are shown, namely: a Cylinder 0 entry 52, a Cylinder 1 entry 53 and a Cylinder n entry 54.

The header 51 has a structure or block 55 as shown in FIG. 2 and is described in further detail later. Each of the cylinder entries, such as Cylinder 0 entry 52, points to a different block of locations that define a corresponding Track ID table, such as Track ID table 56, with each location being assigned to a particular track in the cylinder. Two track entries are shown in the Track ID table 56, namely: a Track 0 entry 57 and a Track E entry 58 for individual physical devices in which each cylinder comprises fifteen data tracks.

The device entry 48 comprises a block 60 that includes a header 61 and cylinder entries. FIG. 2 depicts three particular cylinder entries including a Cylinder 0 entry 62 that identifies a Track ID Table 63. The Track ID Table 63 includes, in this particular embodiment, three entries, namely: a Track 0 entry 64, a Track 1 entry 65 and a Track E entry 66. Additional cylinder entries in the block 60 will be included. FIG. 2 depicts two such entries, namely: a Cylinder 1 entry 67 and a Cylinder m entry 68. As will become apparent, n=m or n≠m. The DEST B device entry 50 will have an analogous structure.

Still referring to FIG. 2, the header block 51 for the source storage device entry 48 includes various items of information that will be interpreted differently depending upon whether a particular device is acting as a source or as a destination storage device. FIG. 2 discloses a specific implementation in which a header block 55 includes an extents track pointer 70, a session ID entry 71, a request buffer entry 72, an FSMF flag entry 73 and a password entry 74. When the header 51 is associated with a source storage device, the password entry has a predetermined value. This value defines the extents track pointer 70 as containing an address to an extents track 75, shown in greater detail in FIG. 3 as comprising a header 76 and one or more extent buffers 77. The FSMF flag 73 FIG. 2 indicates whether the device is a destination storage device as used in this invention or a BCV device as disclosed in U.S. Pat. No. 6,101,497 assigned to the assignee of this invention.

A copy program that operates independently of the host processor array 21 is an integral component of this copying process. This program operates in response to a command with a particular data structure that contains alternate entries depending upon whether the request comes from a source storage device or a destination storage device. In the disclosed embodiment, a request, in either form, directs a copy program located in the disk adapter associated with the source storage device, such as the copy program 84 in the disk adapter 30 shown in FIG. 1, to begin a process by which data is copied from the source to the destination storage device.

Figure 3:
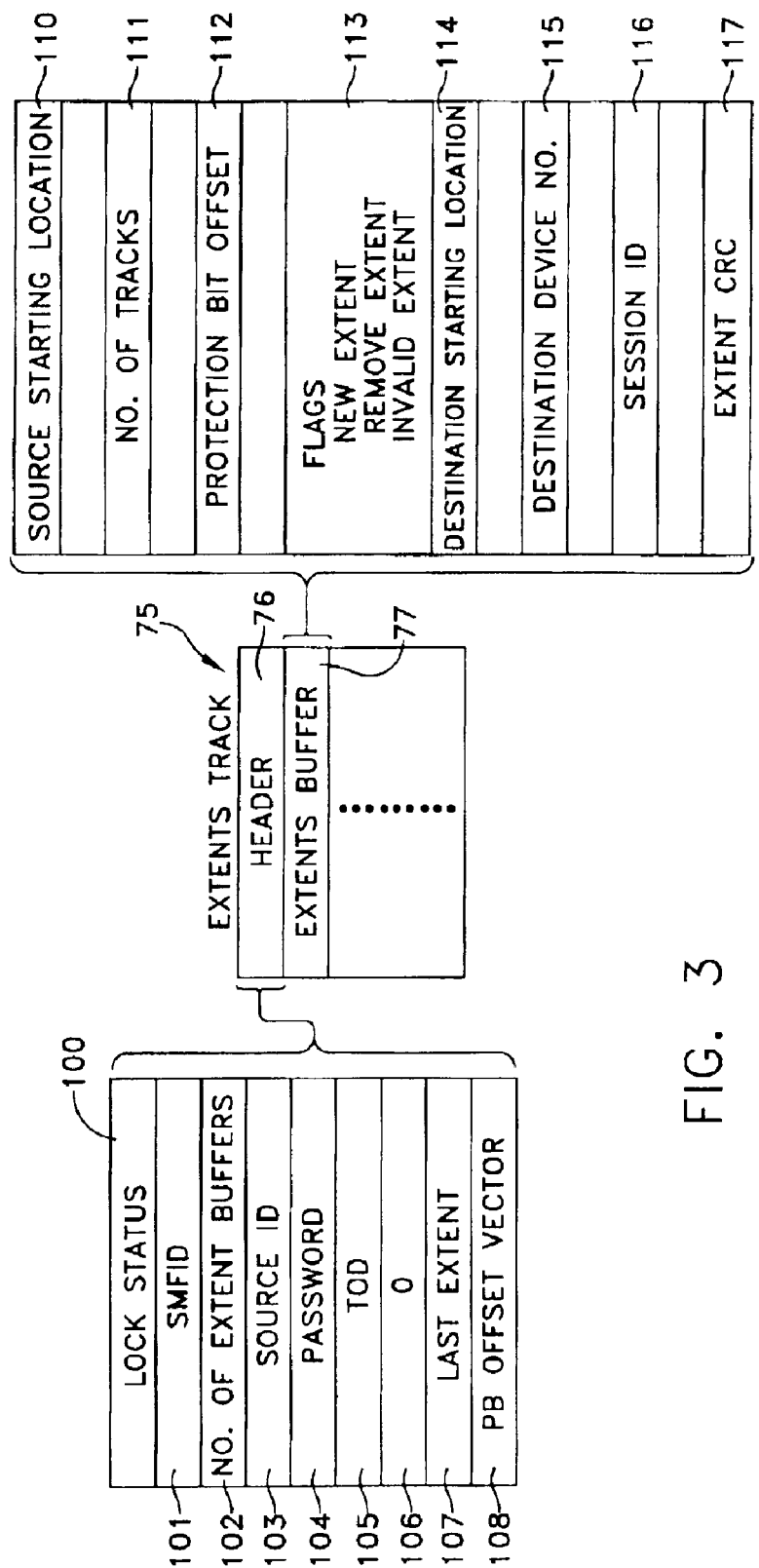
FIG. 3 is a more detailed view of an extents track in the cache memory of FIG. 2.

The operation in a data storage facility in response to the receipt of a FILE SMMF copy command can be defined in phases as follows:

1. a first phase that begins when a requesting host application issues a "FILE SMMF" command and ends when a response is sent to the requesting host application indicating that the copy command has been processed. During this phase the requesting host application, the host adapter and source storage device adapter produce an extents track structure as shown in FIG. 3 for storage in an extents track at a location defined by the requesting host application. As an example, the requesting host application could assign the extents track to a track 85 in the source storage device 31 in FIG. 1 that then could be accessed by any device. For maximum effectiveness the requesting host application could also set a parameter so that the extents track also resided in the cache memory 27 for the duration of the operation.

2. A second phase that begins when a request for a copy operation is generated and ends when all the data has been copied. During this phase the copy program in the source storage device duplicates the data on a data-block-by-data-block basis, i.e., on a track-by-track basis in the selected destination storage locations. For example, if the FILE SMMF command identifies the file 36 as the source and locations 40 as the destination, each track in the file 36 will transfer to locations 40 in sequence. If the FILE SMMF command identifies the file 37, the copy program will transfer from the two non-contiguous sites 37A and 37B in the source storage device 31 to the contiguous track locations 41 in the DEST B device 35. During this phase any attempt to access data on either the source or destination storage device is handled in an expeditious manner.

3. A modification/termination phase during which the copy operation can be modified or terminated.

Differential SNAP Operation

There are several ways to adapt the foregoing system for differential SNAP or copying operations. For example, a differential SNAP command can be processed primarily in a host. As another example, the differential SNAP command can be processed entirely within the data storage facilities. As still another implementation, processing may occur in both the host and the data storage facilities. However, in whatever implementation, this invention provides a method and apparatus for copying data from addressed locations in a source storage device comprising one or more extents to addressed locations in a destination storage device through a series of copying operations that occur after arbitrarily spaced time intervals. A first copy operation enables the copy program to transfer all the data in data blocks of some size on a data-block-by-data-block basis from the source storage device to the destination storage device. After some interval a second copying operation is initiated. The copy program receives information to add to the data blocks to be copied, but this information only identifies those data blocks that were changed in the source or destination storage devices by other host applications during the prior interval. Consequently the second copying operation is a differential operation and successive copying operations also produce differential operations.

Host Implementation

Figure 4:
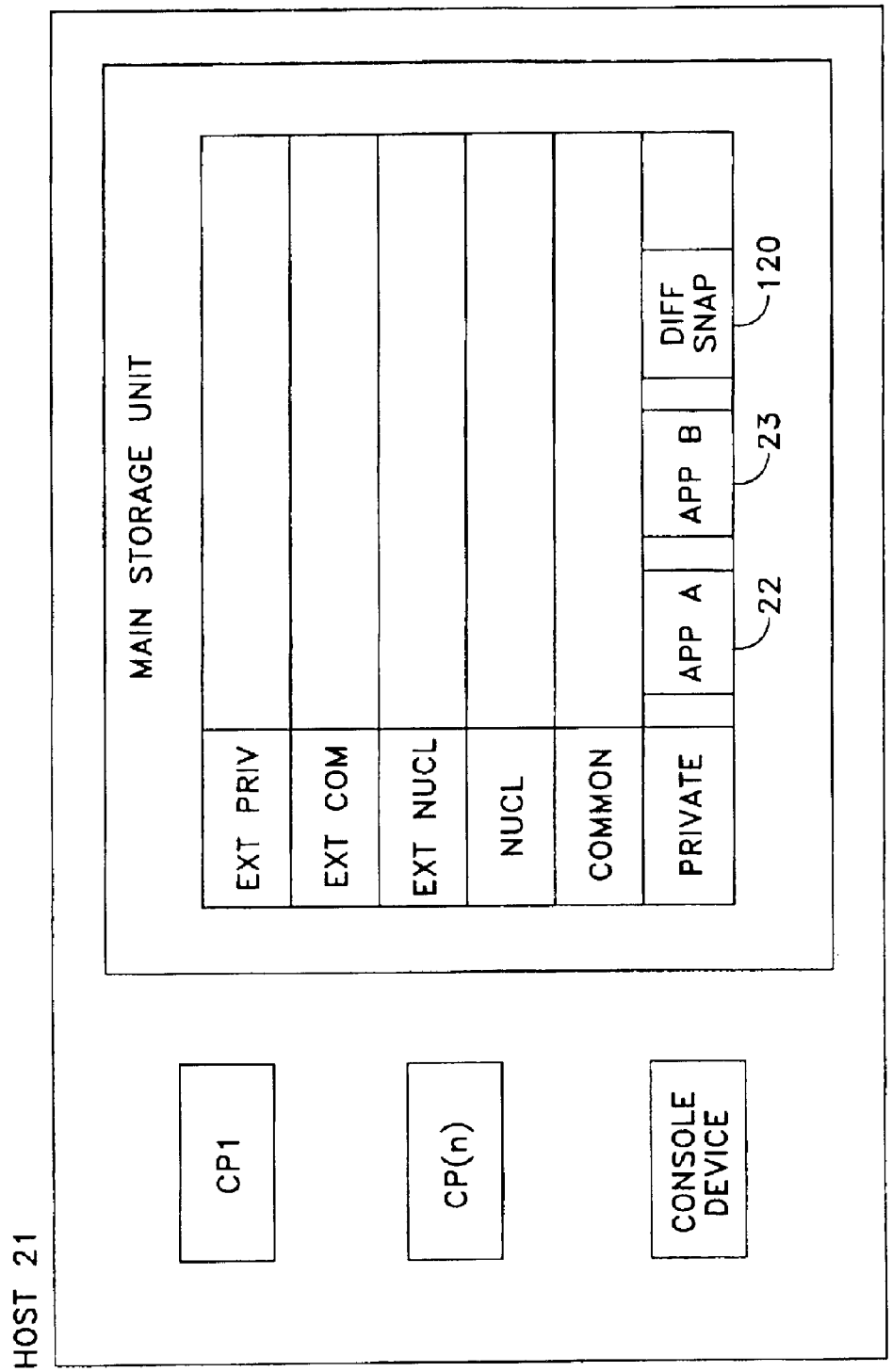
FIG. 4. is a view in more detail depicting a host with processors, a console and a main storage unit.

Looking at a first approach for performing operations in accordance with this invention, FIG. 1 depicts a host array 21 modified the addition of DIFF SNAP application 120 for implementing this invention. As the DIFF SNAP application is incorporated into a host, a review of the host construction and operation will be helpful to a fuller understanding of this invention. More specifically, FIG. 4 depicts two central processors CP(1) and CP(n) associated with the host 21. These central processors and others, if included, communicate with a main storage unit. As known, when such a system utilizes an MVS or similar operating system, the main storage unit is divided into a number of areas including common and private areas and extended common and extended private areas that store data and programs, or application, such as the APP A application 22, the APP B application 23 and the DIFF SNAP application 120. A console device permits an operator to communicate with the system for performing a number of configuration, diagnostic and other procedures independently of operations that occur in response to any application programs.

Figure 5:
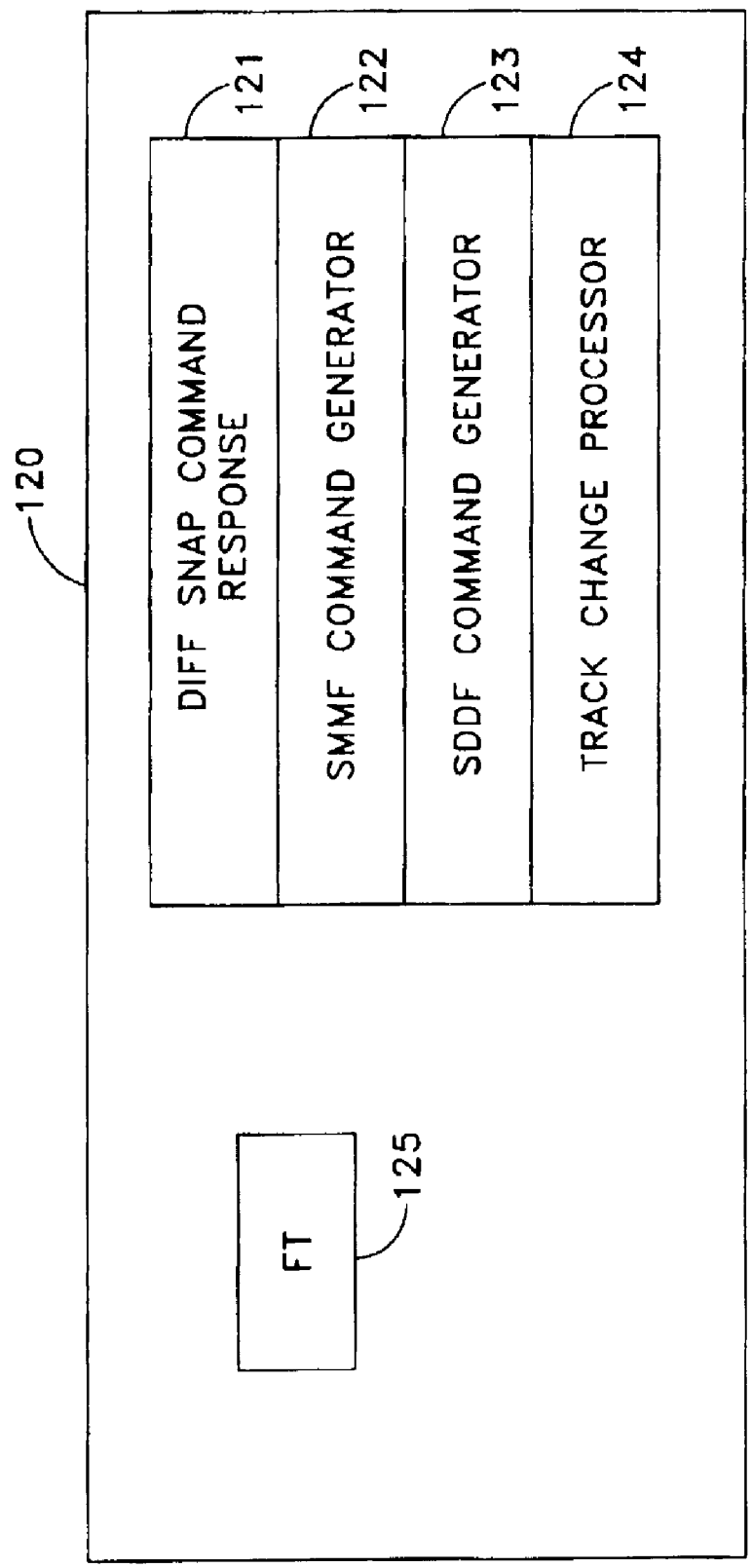
FIG. 5 is a detailed diagram useful in understanding one application that incorporates this invention.

When any application program, such as the DIFF SNAP application program 120, is loaded into a main storage unit, the MVS operating system provides an address space for that program. FIG. 5 represents a functional organization of the address space assigned to the DIFF SNAP application 120. More specifically, the corresponding address space, also designated by reference numeral 120, comprises a block of program modules that interact to provide the differential copying of this invention. A load and initialize module (not shown) loads the functional modules into the address space 120 and establishes various data structures.

FIG. 5 particularly depicts certain modules and a flag that are useful in a host-based implementation this invention including a DIFF SNAP command response module 121. The DIFF SNAP command response module 121 generates a number of commands for transfer to the data storage facility by means of an SMMF command generator 122 and an SDDF command generator 123. A track change processor 124 utilizes recordings of track changes to limit the number of tracks that are processed during a differential copying operation. An FT flag 125 distinguishes a first use of the DIFF SNAP application 120 from subsequent uses when the data copies will be differential copies in accordance with this invention. This FT flag 125 will generally be set to a predetermined state (e.g., FT=1) when the application is loaded thereby to indicate a following operation of the DIFF SNAP command response module 121 is a first operation.

Figure 6:
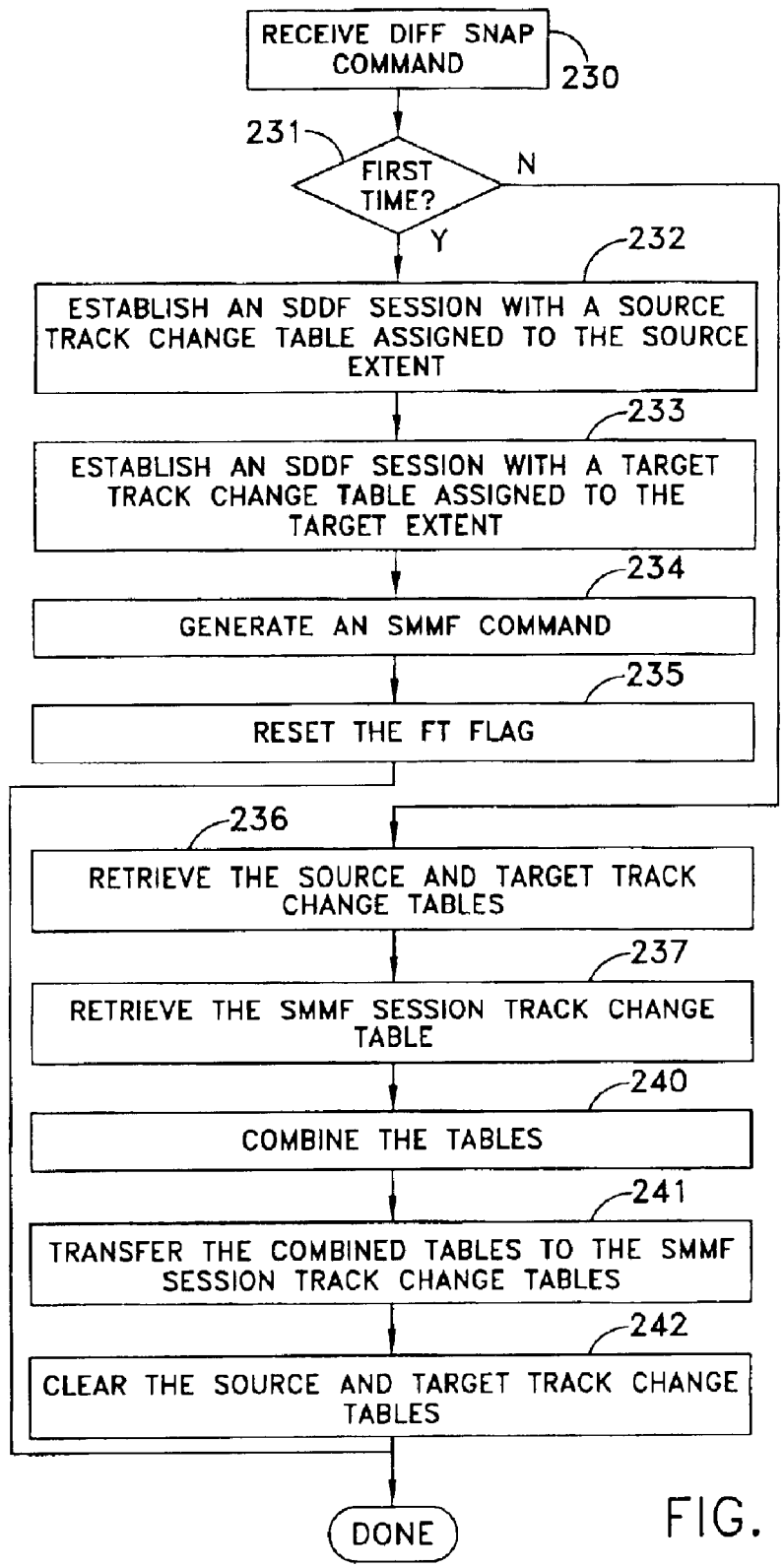
FIG. 6 is a flow chart that depicts the operation of a differential copy application program that is useful in one implementation of this invention.

Referring now to FIG. 6, step 230 represents the receipt of a DIFF SNAP command generated by an application and the host response by the DIFF SNAP application 120. The DIFF SNAP command can be a conventional SNAP command with an added argument that establishes a differential copy mode. Step 230 also represents the decoding of each command to respond specifically to a DIFF SNAP command by transferring control to step 231 and the imposition of an IOS level lock of further operations.

Step 231 examines the state of the FT flag 125 in FIG. 5. If it is set, this is the first operation and the beginning of an initial interval. If the FT flag 125 is not set, the operation is occuring at the beginning of a second or subsequent interval.

When the FT flag 125 is set, control transfers to step 232 that utilizes the SDDF command generator 123 to establish an SDDF session with a track change table assigned to the source extent as identified by the source starting location 110 in FIG. 3. For purposes of this invention, an SDDF session selects one of the data blocks for containing protection bits in the PB header for the source storage device, such as PB header 96 in FIG. 2. Step 233 uses a similar process to define another track change table that is assigned to the destination device. In the following discussions these two selected tables are designated as a source track, or data block, change table and a destination track, or data block, change table, respectively. When steps 232 and 233 form these tables, all the bit positions are cleared to indicate that no tracks are changed as an initial condition.

Step 234 utilizes the SMMF command generator 122 to initiate a SNAP operation. This is a full SNAP operation so a copy program, like the copy program 84 in FIG. 1, begins a data-block by-data-block transfer of all the data in the, defined extents from the source storage device to the destination device. Step 235 then resets the FT flag (e.g., FT=0). Then the SMMF command generator 122 issues an acknowledgement to the host computer, even before the copy program actually begins to transfer data in response to that command. When the host receives an acknowledgement that the SMMF command has completed, it can lower the host IOS lock applied in step 230 to permit access to the logical volumes.

Steps 232 through 234 then operate at the beginning of a first interval to initialize the source and destination change recordings constituted by the source and destination track change tables and a data block selection control for the copy program constituted by the PB bits for the source storage device and the IND bits for the destination storage device that are associated with the SMMF command to identify all the data blocks to be copied. In the following discussion, these components of the data block selection control are called the SMMF PB and SMMF IND bits respectively. The collection of these bits define an SMMF PB binary table and an SMMF IND binary table. With all the SMMF PB and SMMF IND bits set, the copy program responds to a first request by starting the repetitive process of copying of all the data blocks in the extent from the source storage device to the destination storage device.

If a write operation occurs at the source storage device, the corresponding track change table records the change as by setting a bit corresponding to a changed track. A write operation to the destination devices produces a similar result in the destination track change table.

If, after a given interval, the host runs the DIFF SNAP application again, the IOS levels of the selected logical volumes are raised to serialize operations and block any access to the data in the extents. In a second and successive operation the FT flag 125 is reset because the operation is not a first time operation. Control therefore transfers to step 236 in FIG. 6. Step 236 retrieves the source and destination track change tables produced during the SDDF sessions by other applications. That is, these tables record, during a given interval between successive copying operations any change to the respective storage devices produced by host applications. Thus when a next command is received, these track change tables indicate all the data blocks, or tracks, that were changed during the given interval.

Step 237 retrieves information in the track change tables associated with operations in response to the SMMF command. As previously indicated these are the SMMF PB bits for the source storage device and by the SMMF IND bits for the destination storage device. They represent the state of any prior copying operation.

Step 240 combines all these binary tables in a logical "OR" operation. The result reflects collectively the changes to the source and destination devices since the last copy operation plus any changes from a previous operation that have not been completed. The result therefore represents all the destination device tracks that must be changed so the destination storage device replicates the data in the source storage device, but only those changes. Consequently the combination defines the differential operation that must occur.

Step 241 transfers this combination to the SMMF PB bits and the SMMF IND bits. Assuming that all operations in response to a prior SMMF operation have been completed, the PB bits and the IND bits associated with the source and destination devices, respectively, reflect only the tracks that need to be changed. The copy program then begins to copy each data block, such as a track, based upon the information in these two binary track tables.

Concurrently with the beginning of operations by the copy program, control transfers to step 242 to clear the source and destination track change tables whereby the recordings thereafter reflect only the changes made to the source and destination storage devices by other host applications. Responses to successive DIFF SNAP commands transfer control from step 231 to step 236 so that each subsequent differential command only produces a transfer of changed tracks.

Thus, in this embodiment the source and destination storage devices are components of a data storage facility that interacts with host applications operating in a host computer system. The copy program operates in and the data block recordings occur in the data storage facility. However, the DIFF SNAP application 120 of FIG. 1 in host computer system performs the retrieval, combining and transferring functions by which the information in the source and destination change recordings and the data block selection control information is combined and returned to the data storage facility for updating the data block selection control for the copy program.

Data Storage Facility Implementation

Figure 7:
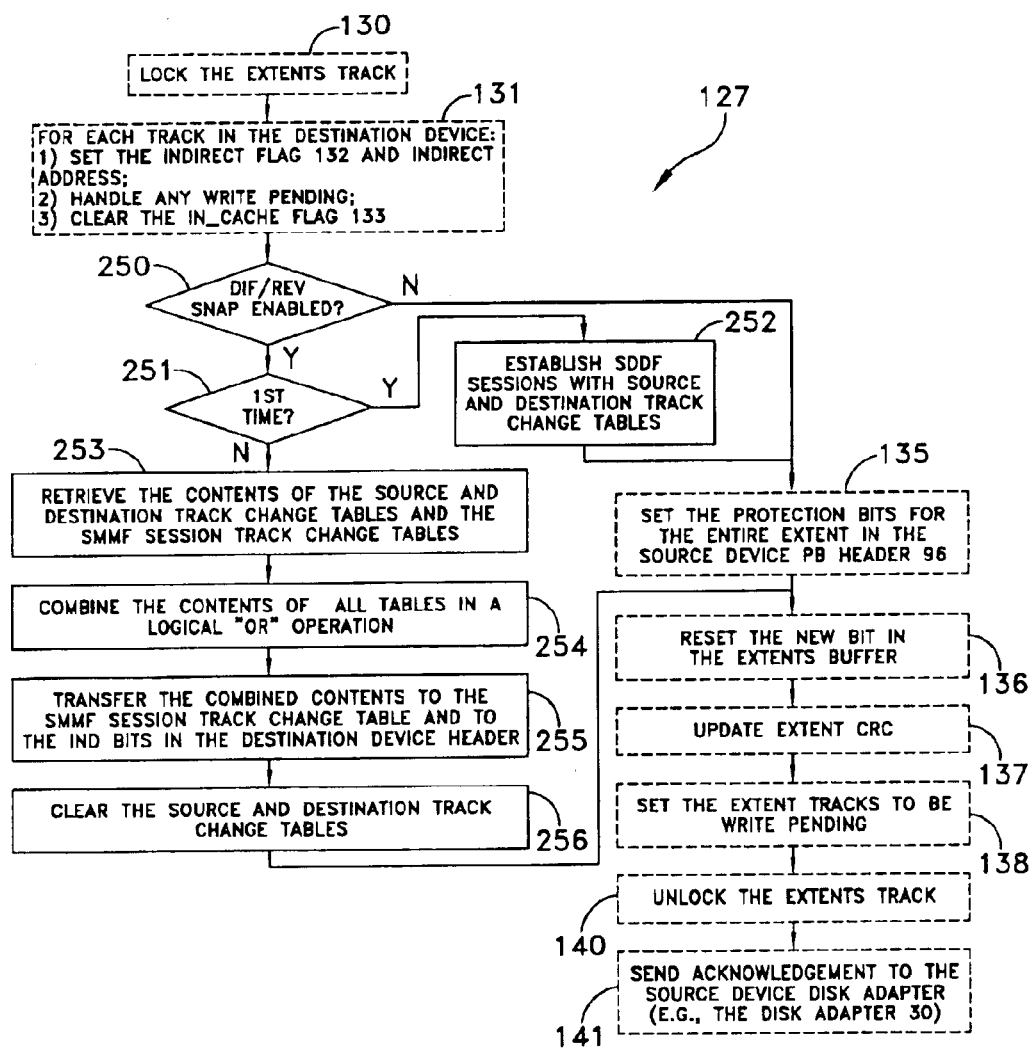
FIG. 7 depicts first modifications to the controls in the data storage facility for another implementation of this invention.

FIG. 7 depicts modifications of FIG. 7 in the above-identified U.S. Pat. No. 6,363,358 for implementing this invention within a data storage facility in response to an SMMF command with an argument defining a differential copying operation mode. FIG. 7 depicts each of the steps described in the above-identified patent in blocks with dashed line boundaries. Modifications are indicated by steps in blocks with solid line boundaries. In this embodiment the modules for recording and combining are resident in the data storage facility and are operable independently of other host application interaction with the data in the source storage device.

More specifically, generating a DIFF SNAP command in this embodiment passes control to a procedure 127 shown in FIG. 7. If the destination storage device has mirrored physical devices, a procedure, not described in detail but known in the art, assures that all the related mirror devices are inactive. Step 130 selects and locks the corresponding extents track so that no additional changes may be made to that extents track. For each track in the destination storage device, step 131 performs a number of functions. First, it uses the values in the header 61 to determine that the header 61 is associated with a destination storage device and that an indirect (IND) bit position 132 in each track associated with the destination storage device is cleared. Then for every destination track step 131 sets that IND flag and sets an indirect address, that is the address of the track in the source storage device to be copied, to a cache pointer. If there are any pending write operations to the device, they are cleared.

It is assumed that the requesting host application will take no action to destroy data integrity. With this assumption, any write pending operations are irrelevant because they would be replaced by the copied file. Clearing the write pending flag assures that no such data will overwrite the copied file track. Any in-cache (IC) flag 133 that is set in each destination track is cleared. At this point the system may set a write pending bit to effect a transfer of the extents track to the source storage device 31.

Once all this information has been transferred to the track ID tables, the previous process is modified by inserting a test in step 250 that determines whether a differential snap operation has been enabled. If it is not, step 250 transfers control to step 135. If it is, step 251 tests the FT flag, or equivalent mechanism, to determine if the response is a first execution of the differential snap operation. If it is a first operation, step 251 transfers control to step 252 to define the source and destination track change tables. Then control passes to step 135.

Step 135 is the first step in the procedure that performs an SMMF operation on all the data in the defined extents. Specifically, step 135 sets the SMMF PB bits and the SMMF IND bits for each track in the entire extent.

Step 136 resets the NEW EXTENT flag in the flags field 113 shown in FIG. 3. The CRC field is then updated in step 137 and the extents track, such as the extents track 75, is set to be write pending in step 138. The destination storage device controller 88 uses step 140 to unlock the extents track that was locked in step 130. Thereafter another establish extents track system call can alter the extents track. In step 141 the destination storage device controller 88 sends an acknowledgement to the disk adapter 30 associated with the source storage device 31. Other operations may also be completed as part of the response to the SMMF command by which the host adapter controller 87 sends status to the host and reconnects the source storage device to the host application, such as the source storage device 31 to the HOST A APP application 22. Then the copy program begins the repetitive process by which all the data in the defined extent transfers to the destination storage device on a track-by-track basis.

If, however, FIG. 7 is operating in response to a second DIFF SNAP command in a series, steps 250 and 251 transfer control to step 253 that retrieves the contents of the source and destination track change tables and the SMMF session track change tables, the latter two be constituted by the SMMF PB and IND bits in the corresponding tables. Step 254 combines all these tables in a logical OR operation.

Again assuming that a prior copying operation is completed, the result of this logical OR operation identifies only those tracks that have changed since the last copying operation. If, however, the request for a subsequent copying operation occurs before a prior application has been completed, the result of the logical OR operation will be a vector that identifies the combination of the track change since the last transfer and any unprocessed tracks from any prior copying operation. Step 255 then transfers these combined contents to the SMMF session track change tables, specifically the SMMF PB and SMMF IND bits for the source and destination storage devices. Step 256 clears the source and destination track change tables so that they will only record new changes to the source and destination storage devices by other host applications after this copying operation. Control then transfers to step 136 to complete the operation by resetting the NEW bit in the extent buffer and updating the CRC according to the prior process.

Thus, in accordance with this implementation, the host includes a DIFF SNAP command module that can transfer a command to a data storage facility to initiate a copy operation. To implement this invention that command may include a specific code for decoding or may indicate the nature of the operation by a specific argument. The data storage device, particularly either a host adapter or a disk adapter associated with the source storage device, performs the retrieving, combining and transferring functions.

The Copy Program

Figure 8:
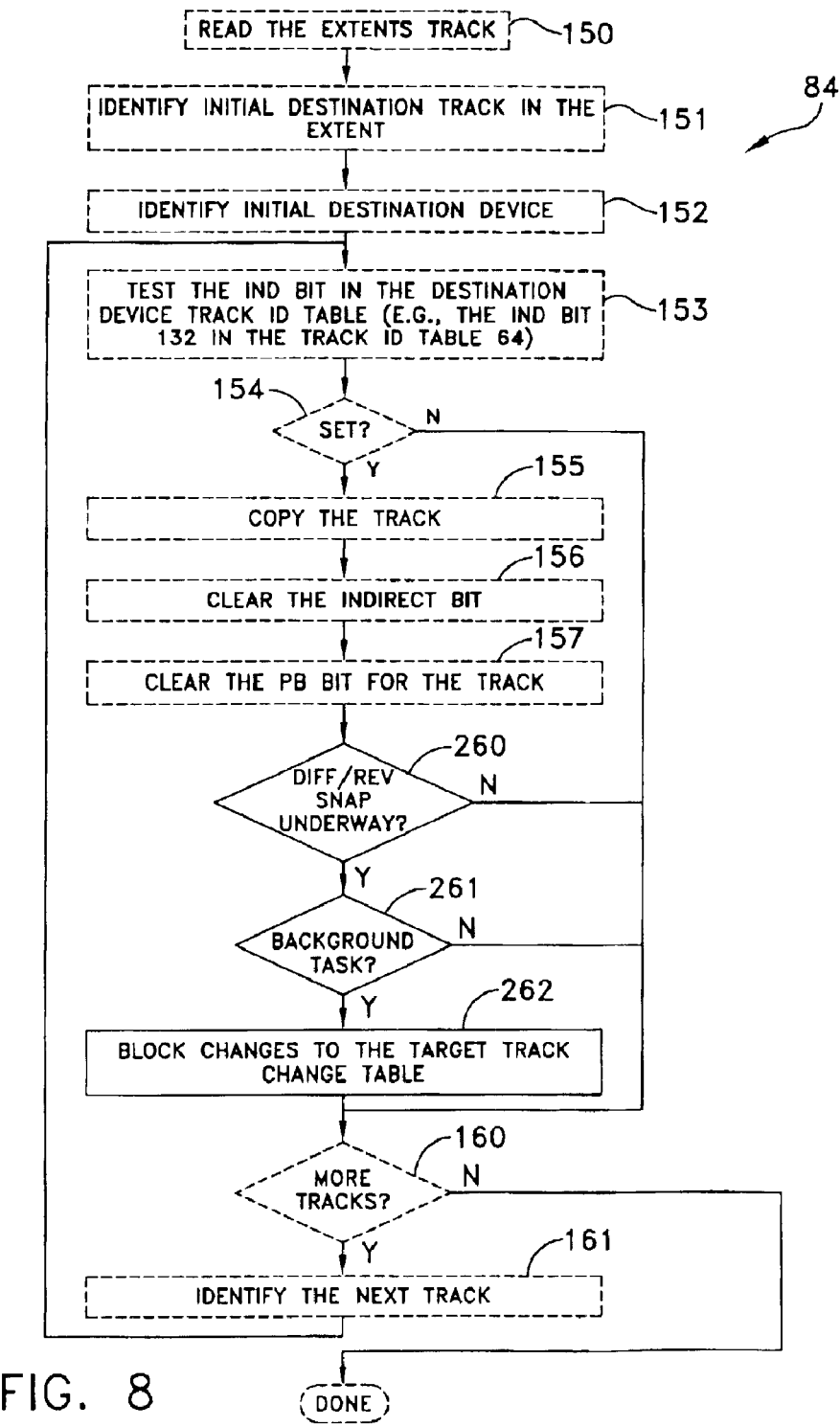
FIG. 8 depicts other modifications to the control of the data storage facility that are useful with either of the operations shown in FIGS. 6 and 7.

FIG. 8 in the above-identified patent application depicts the operation of a copy program 84 that operates with either the host implementation or data storage facility implementation of this invention. The steps of FIG. 8 in the prior application are also shown in FIG. 8 herein in blocks with dashed line boundaries. Step 150 reads the source storage device controller extents track, such as the extents track 75 in FIG. 3. Step 151 uses the data from the extents track 75 to obtain the location of the initial destination track and step 152 identifies the destination storage device so these two items specifically locate the first destination track within the data storage facility 24 in FIG. 1.

Step 153 is the first step in a loop that tests the SMMF IND bit for each track for the defined extent in the destination storage device, such as the IND flags in the Track ID Table 63 in FIG. 2. This test determines whether it is necessary to copy a specific track from the source to the destination. It also is possible for other activity to have effected a transfer of an individual track.

If the data in the track has not been transferred from the source storage device to a destination storage device, step 154 transfers control to step 155 that copies that track, such as from a track in the source storage device 31 to a corresponding or predetermined track in the DEST A destination storage device 33. Step 156 clears the SMMF IND bit for the destination storage device and step 157 clears the corresponding SMMF PB bit for the header 96 in FIG. 2 for the track in the source storage device 31 in FIG. 1.

Clearing the SMMF IND flag assures that an application processing that track in the destination storage device will not try to copy the track; clearing the SMMF PB bit in the source storage device assures that the track will not be copied if a host application accesses that track in the source storage device 31.

If step 154 determines that the SMMF IND bit is not set, no copying occurs and control passes directly to step 160. When all the tracks have been identified in sequence, it is considered that the extent has been transferred and the copy program terminates.

Incorporating this invention includes modifying the foregoing steps by interposing a series of steps between step 157 and step 160. Particularly, it is important that the background task utilized in copying data in response to the normal operation does not impact the destination device. Consequently, in this version step 157 transfers to step 260. If a differential reverse snap is not underway, step 260 transfers directly to step 160; and the copy program 84 runs as described in U.S. Pat. No. 6,363,305. Otherwise, and if the task being processed is a background task, step 261 transfers control to step 262. Step 262 blocks the task from making any changes to the destination change table. However, a change can be made to the source change table. If the task is a foreground task, in response to a read or write request, step 261 transfers control directly to step 160.

The foregoing description discloses two approaches for obtaining differential copies in a data processing system. Each approach has the capability of making independent data copies based upon extents of tracks or other types of extents. As will be apparent still other implementations could be devised that incorporate portions of both the host and data storage facility implementations. In either the host implemented approach of FIG. 6 or the data storage facility implementation of FIG. 7, this invention utilizes two track change tables as supplements to the standard track change tables in an independent data copying operation. One of these complementary tables monitors track changes to the source storage device; the other to the destination storage device. After a first full copy of all the extent tracks, subsequent requests to transfer the extent tracks differentially utilize track change information in those two complementary track change tables to identify only the tracks that have been changed in the source and destination storage devices. The resultant set of tracks then is transferred back into the data storage facility to the track change tables normally used by the device to override the track change tables that would normally identify each track in the extent so that only the tracks in the changed tracks set are transferred. Data in tracks that are not changed is not transferred. As a result there is a significant reduction in the number of iterations of the copy program with a concomitant reduction of the demand on resources in the data storage facility.

This invention has been disclosed in terms of a particular implementation with a specific data storage facility configuration. Specific flags, such as the FT flag, have been defined. FIGS. 6 through 8 disclose operating sequences for host implemented and data storage facility implemented operating sequences. It is understood that these definitions and operating sequences may be altered and others may be eliminated depending upon the configuration and the capabilities of a particular data storage facility with the attainment of some or all of the objectives of this invention. Moreover, it will be apparent to those of ordinary skill in the art that the basic elements of this invention may be implemented in a wide variety of localized and network environments. Therefore, it is the intent of the appended claims to cover all such variations and modifications as come within the true spirit and scope of this invention.

What is claimed as new and desired to be secured by Letters Patent of the United States is:

1. A method for copying data organized in designated data blocks from addressed locations in a source storage device to addressed locations in a destination storage device with a series of copying operations by using a copy program that has a data block selection control for defining the designated data blocks to be copied, said method including the steps of:

A) recording, during a given interval between successive copying operations, the occurrence of a change to any data block in the source and destination storage devices respectively, whereby at the end of the given interval the source and destination data block change recordings identify each data block in the source and destination storage devices, respectively, that changed during the given interval, and B) at the beginning of a successive interval:
  i) combining the information in the source and destination change recordings and in the data block selection control thereby to identify those of the designated data blocks that need to be copied by virtue of each change during the given interval, and
  ii) changing the source and destination data block recordings whereby the recordings thereafter reflect only the occurrence of changes made to the source and destination device data blocks during the successive interval.

2. A method as recited in claim 1 wherein at the beginning of an initial interval said method includes the steps of initializing the source and destination change recordings and setting the data block selection control to identify all the designated data blocks to be copied whereby the copy program initiates the copying of all the data blocks from the source device to the destination device during an initial interval.

3. A method as recited in claim 2 additionally comprising the step of defining a first given interval as an initial interval and successive intervals as other than a first interval.

4. A method as recited in claim 1 wherein the copying program data block selection control records the occurrence of data block changes made to the source storage device and, independently, the occurrence of data block changes made to the destination storage device, said combining step combining the source and destination data block change recordings and the independent copy program selection control recordings and transferring the combined recordings to the independent data block selection control recordings.

5. A method as recited in claim 1 wherein the source and destination storage devices are components of a data storage facility that interacts with host applications operating in a host computer system, wherein the copy program operates in and the data block recordings occur in the data storage facility and wherein the application in the host computer system combines the information in the source and destination change recordings and the data block selection control.

6. A method as recited in claim 5 wherein the data block selection control includes independent recordings of the occurrence of changes made to the source and destination storage devices by the copy program and wherein each of the recordings is a binary table, the conversion application retrieving each of the binary tables and combining the contents of all of the binary tables in a logical OR operation.

7. A method as recited in claim 6 additionally comprising the step of transferring the result of logical OR operation to the data block selection control binary tables.

8. A method as recited in claim 1 wherein the source and destination storage devices are components of a data storage facility that interacts with host applications operating in a host computer system, wherein the copy program operates in and the data block recordings occur in the data storage facility and wherein the host computer system includes an application for issuing a command to initiate a copy operation, said recording, combining and changing operations occuring in the data storage facility in response to the command from the host computer system.

9. A method as recited in claim 8 wherein the data block selection control includes independent recordings of the occurrence of changes made to the source and destination storage devices by the copy program and wherein each of the recordings is a binary table, said combining step retrieving each of the binary tables and combining the contents of all of the binary tables in a logical OR operation.

10. A method as recited in claim 9 additionally comprising the step of transferring the result of logical OR operation to the data block selection control binary tables.

11. Apparatus for copying data organized in designated data blocks from addressed locations in a source storage device to addressed locations in a destination storage device with a series of copying operations by using a copy program that has a data block selection control for defining data blocks to be moved, said apparatus comprising:
A) source change recording means and destination change recording means for recording, during an interval between successive copying operations, the occurrence of a change to a data block in the source and destination storage devices, respectively, whereby at the end of the given interval said source and destination data block change recording means identify each data block in the source and destination storage devices, respectively, that changed during the given interval, and
B) means operable at the beginning of a successive interval for controlling said copy program including:
i) means for combining the information in said source and destination change recording means and in the data block selection control thereby to identify those of the designated data blocks that need to be copied by virtue of each change during the given interval, and
ii) means for changing the source and destination data block recording means thereafter to reflect only the occurrence of changes made to the source and destination device data blocks during the successive interval.

12. Apparatus as recited in claim 11 additionally comprising first initializing means operable at the beginning of an initial interval for initializing the source and destination change recordings and second initializing means for setting the data block selection control to identify all the designated data blocks whereby the copy program initiates the copying of the data on all the designated data blocks from the source device to the destination device during an initial interval.

13. Apparatus as recited in claim 12 additionally comprising means for defining a first given interval as an initial interval and successive intervals as other than a first interval.

14. Apparatus as recited in claim 11 wherein said copy program includes first and second data block selection control records means for independently recording the occurrence of data block changes made to the source storage device and the occurrence of data block changes made to the destination storage device, respectively, said combining means including means for combining the information in said source and destination data block change recordings and said copy program selection control record means and means for transferring the combined information to each of said first and second data block selection control record means.

15. Apparatus as recited in claim 11 wherein the source and destination storage devices are components of a data storage facility that interacts with host applications operating in a host computer system, wherein the copy program operates in and the data block recordings occur in the data storage facility and wherein a conversion application in the host computer system combines the information in the source and destination change recording means and the data block selection control means.

16. Apparatus as recited in claim 15 wherein the data block selection control includes first and second means for recording the occurrence of changes made to the source and destination storage devices by the copy program, respectively, and wherein each of said recording means is a binary table, said conversion application including means for retrieving each of said binary tables and means for combining the contents of all said binary tables in a logical OR operation.

17. Apparatus as recited in claim 16 additionally comprising means for transferring the result of logical OR operation to both of said data block selection control binary tables.

18. Apparatus as recited in claim 11 wherein the source and destination storage devices are components of a data storage facility that interacts with host applications operating in a host computer system, wherein said source and destination change recording means and said data block selection control, recording means, said combining means and said changing means are located in the data storage facility, said apparatus additionally including means in the data storage means for responding to a command from the host computer system for initiating the operation.

19. Apparatus as recited in claim 18 wherein the data block selection control includes first and second recording means for recording the occurrence of changes made to the source and destination storage devices by the copy program, respectively, and wherein each of said recording means comprises a binary table, said combining means including means for retrieving each of said binary tables and means for combining the contents of all of said binary tables in a logical OR operation.

20. Apparatus as recited in claim 19 additionally comprising means for transferring the result of logical OR operation to both of said data block selection control binary tables.

21. A method for copying data organized in designated data blocks from addressed source tracks in a source magnetic disk data storage device to addressed destination tracks in a destination magnetic disk data storage device with a series of copying operations by using a copy program that has a track block selection control for defining data tracks to be copied, said method including the steps of:
  A) recording in source and destination data blocks any change, during a given interval between successive copying operations, the occurrence of a change to any data track whereby at the end of the one interval the source and destination data block change recordings identify each source and destination track that changed during the one interval, respectively, and
  B) at the beginning of a successive interval:
    i) combining the information in the source and destination change track recordings and in the track selection control thereby to updated the track block selection control with the identification of those data tracks in the designated data blocks that need to be copied by virtue of each track change during the given interval, and
    ii) changing the source and destination track recordings whereby the recordings thereafter reflect only the occurrence of changes made to the source and destination tracks during the successive interval.

22. A method as recited in claim 21 wherein, at the beginning of an initial interval, said method includes the steps of initializing the source and destination change recordings and setting the track selection control to identify all the data tracks to be copied whereby the copy program initiates the copying of all data in the source tracks containing the designated blocks to the destination tracks during an initial interval.

23. A method as recited in claim 22 additionally comprising the step of defining a first given interval as an initial interval and successive intervals as other than a first interval.

24. A method as recited in claim 21 wherein the copying program track selection control records the occurrence of track changes made to the source storage device and, independently, to the destination storage device, said combining step combining the source and destination track change recordings and the independent copy program selection control recordings and transferring the combined recordings to the independent data block selection control recordings.

25. A method as recited in claim 21 wherein the source and destination storage devices are components of a data storage facility that interacts with host applications operating in a host computer system, wherein the copy program operates in and the data block recordings occur in the data storage facility and wherein the host computer system combines the information in the source and destination change recordings and the data block selection control.

26. A method as recited in claim 25 wherein the data block selection control includes independent recordings of the occurrence of changes made to the tracks in source and destination storage devices by the copy program and wherein each of the recordings is a binary track table, the conversion application retrieving each of the binary track tables and combining the contents of all of the binary track tables in a logical OR operation.

27. A method as recited in claim 26 additionally comprising the step of transferring the result of logical OR operation to both of the data block selection control binary track tables.

28. A method as recited in claim 21 wherein the source and destination storage devices are components of a data storage facility that interacts with host applications operating in a host computer system, wherein the copy program operates in and the data block recordings occur in the data storage facility and wherein the host computer system includes an application issuing a command to initiate a copy operation, said recording, combining and changing operations occuring in the data storage facility in response to the command from the host computer system.

29. A method as recited in claim 28 wherein the track selection control includes independent recordings of the occurrence of changes made to the source and destination storage devices by the copy program and wherein each of the recordings is a binary track table, said combining step retrieving each of the binary track tables and combining the contents of all of the binary track tables in a logical OR operation.

30. A method as recited in claim 29 additionally comprising the step of transferring the result of logical OR operation to both of the data block selection control binary track tables.

31. Apparatus for copying data from designated tracks in a source storage device to tracks in a destination storage device during a copying operation with a series of copying steps using a copy program that has a track selection control for defining tracks to be copied, said apparatus comprising:
  A) source and destination device track tables that record, during one interval between successive copying operations, the occurrence of a change to any data track in source and destination storage devices, respectively, whereby at the end of the given interval the source and destination device track tables identify each data track in the source and destination storage devices, respectively, that changed during the given interval, and
  B) means operable at the beginning of a successive interval for identifying all the data tracks to be copied including:
    i) means for combining the information in the source and destination change track tables with the information in the data track selection control thereby to identify those designated data tracks that need to be copied by virtue of each change during the given interval, and
    ii) changing the source and destination change track tables whereby said tables thereafter reflect only the occurrence of changes made to the source and destination device data tracks during the successive interval.

32. Apparatus as recited in claim 31 wherein said apparatus includes means operable at the beginning of an initial interval for initializing the source and destination change track tables and means for setting the data track selection control to identify each designation data track whereby the copy program initiates the copying of all the designation data tracks from the source device to the destination device during an initial interval.

33. Apparatus as recited in claim 32 additionally comprising means for defining a first given interval as an initial interval and successive intervals as other than a first interval.

34. Apparatus as recited in claim 31 wherein said copy program data track selection control records independently the occurrence of data track changes made to the source storage device and data track changes made to the destination storage device, said combining means including means for combining the source and destination data track tables and the copy program selection control recordings and means for transferring the combined information to the data track selection control recordings.

35. Apparatus as recited in claim 31 wherein the source and destination storage devices are components of a data storage facility that interacts with host applications operating in a host computer system, wherein the copy program operates in and the data track recordings occur in the data storage facility and wherein a conversion application in the host computer system includes means for combining the information in the source and destination change track tables and the data block selection control.

36. Apparatus as recited in claim 35 wherein the data block selection control includes first and second track tables for recording the occurrence of changes made to the source and destination storage devices, respectively, by the copy program and wherein each of said tables is a binary table, said conversion application means including means for retrieving each of said binary tables and means for combining all of said binary tables in a logical OR operation.

37. Apparatus as recited in claim 36 additionally comprising means for transferring the result of logical OR operation to both of said track block selection control binary track tables.

38. Apparatus as recited in claim 31 wherein the source and destination storage devices are components of a data storage facility that interacts with host applications operating in a host computer system, wherein said copy program and the data block recordings operate in the data storage facility and wherein the host computer system issues a command for initiating a copy operation, said apparatus additionally including means responsive to the command for controlling the operation of said recording means, said combining means and said changing means located in the data storage facility.

39. Apparatus as recited in claim 38 wherein the track block selection control means includes means for recording the occurrence of track tables changes made to the source and destination storage devices, respectively, by said copy program and wherein each of the said tables is a binary track table, said combining means including means for retrieving each said binary track table and means for combining the contents of all said binary track tables in a logical OR operation.

40. Apparatus as recited in claim 39 additionally comprising means for transferring the result of logical OR operation to all said binary track tables.

41. A method for copying data organized in designated data blocks from addressed locations in a source storage device to addressed locations in a destination storage device with a series of copying operations by using a copy program that has a data block selection control for defining the designated data blocks to be copied, said method including the steps of:
A) recording, during a given interval between successive copying operations, the occurrence of a change to any data block in the source and destination storage devices whereby at the end of the given interval the data block change recordings identify each data block in the source and destination storage devices that changed during the given interval, and
B) at the beginning of a successive interval:
  i) obtaining the information in the data block change recordings and in the data block selection control thereby to identify those designated data blocks that need to be copied by virtue of each change during the given interval, and
  ii) changing the data block recordings whereby the recordings thereafter reflect only the changes made to the designated source and destination device data blocks during the successive interval.

42. A method as recited in claim 41 wherein at the beginning of an initial interval said method includes the steps of initializing the data block change recordings and setting the data block selection control to identify all the designated data blocks to be copied whereby the copy program initiates the copying of all the data blocks from the source device to the destination device during an initial interval.

43. A method as recited in claim 42 additionally comprising the step of defining a first given interval as an initial interval and successive intervals as other than a first interval.

44. A method as recited in claim 41 wherein the source and destination storage devices are components of a data storage facility that interacts with host applications operating in a host computer system, wherein the copy program operates in and the data block recordings occur in the data storage facility and wherein the an application in host computer system combines the information in the data block change recordings and the data block selection control.

45. A method as recited in claim 41 wherein the source and destination storage devices are components of a data storage facility that interacts with host applications operating in a host computer system, wherein the copy program operates in and the data block recordings occur in the data storage facility and wherein the host computer system includes an application for issuing a command to initiate a copy operation, said recording, combining and changing operations occuring in the data storage facility in response to the command from the host computer system.

46. Apparatus for copying data organized in designated data blocks from addressed locations in a source storage device to addressed locations in a destination storage device with a series of copying operations by using a copy program that has a data block selection control for defining the designated data blocks to be moved, said apparatus comprising:
A) data block change recording means for recording, during an interval between successive copying operations, the occurrence of a change to any data block in the source and destination storage devices, respectively, whereby at the end of the given interval said data block change recording means identifies each data block in the source and destination storage devices that changed during the given interval, and
B) means operable at the beginning of a successive interval for controlling said copy program including:
  i) means for obtaining the information in said data block change recording means and in the data block selection control thereby to identify those designated data blocks that need to be copied by virtue of each change during the given interval, and
  ii) means for changing said data block change recording means thereafter to reflect only the changes made to the source and destination device data blocks during the successive interval.

47. Apparatus as recited in claim 46 additionally comprising first initializing means operable at the beginning of an initial interval for initializing said data block change recording means and second initializing means for setting the data block selection control to identify each data block whereby the copy program initiates the copying of all the data blocks from the source device to the destination device during an initial interval.

48. Apparatus as recited in claim 47 additionally comprising means for defining a first given interval as an initial interval and successive intervals as other than a first interval.

49. Apparatus as recited in claim 46 wherein the source and destination storage devices are components of a data storage facility that interacts with host applications operating in a host computer system, wherein the copy program operates in and the data block recordings occur in the data storage facility and wherein a conversion application in the host computer system combines the information in said data block data change recording means and the data block selection control means.

50. Apparatus as recited in claim 46 wherein the source and destination storage devices are components of a data storage facility that interacts with host applications operating in a host computer system, wherein said data block recording means and said data block selection means, said combining means and said changing means are located in the data storage facility, said apparatus additionally including means in the data storage means for responding to a command from the host computer system for initiating the operation.

* * * * *